Dec. 23, 1969 A. E. WALKER 3,485,952
ELECTRONIC PHONE CONTROL
Filed Jan. 23, 1967
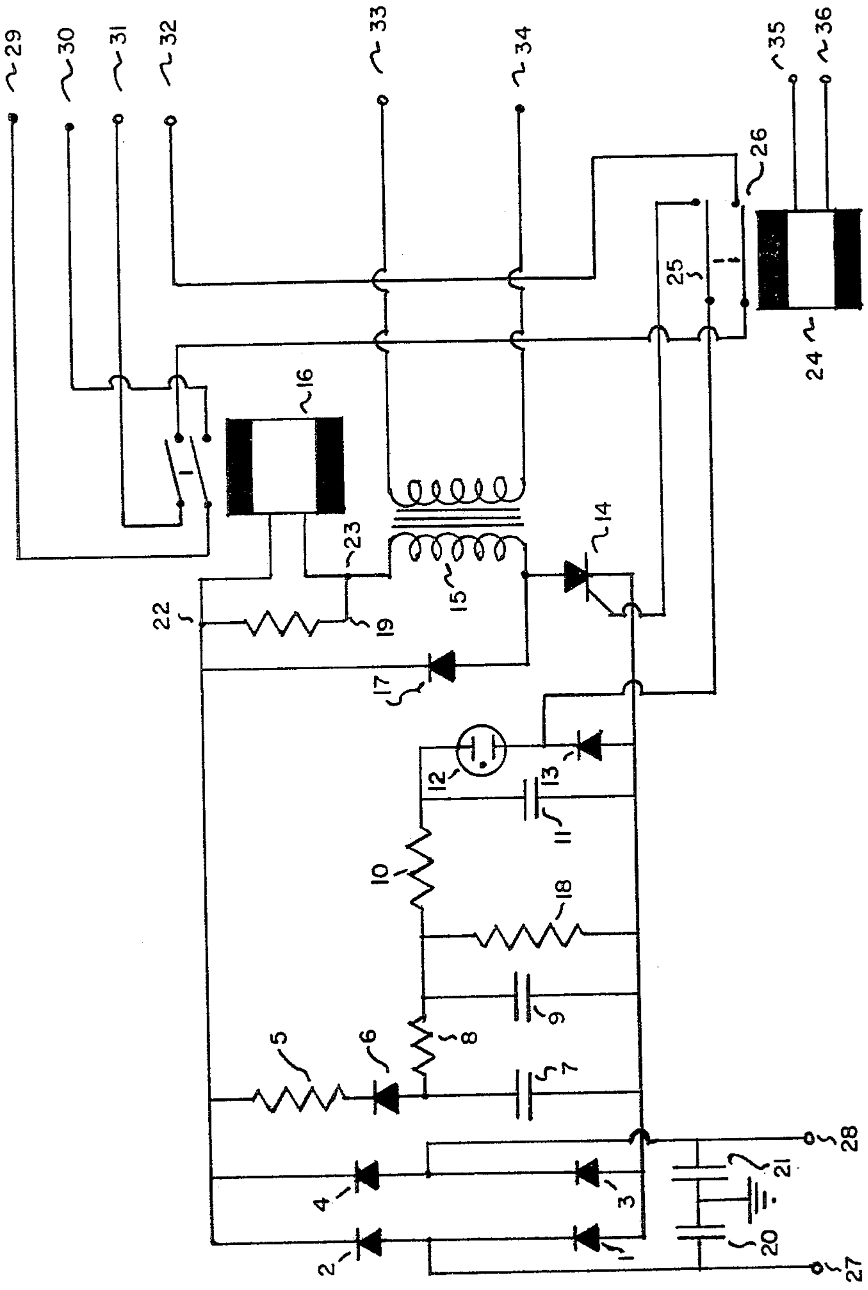

3,485,952
Patented Dec. 23, 1969

3,485,952

ELECTRONIC PHONE CONTROL

Alvin E. Walker, 2202 W. Avalon Drive, Phoenix, Ariz. 85015

Filed Jan. 23, 1967, Ser. No. 610,840
Int. Cl. H04m *11/00;* H03k *17/00*
U.S. Cl. 179—2 3 Claims

ABSTRACT OF THE DISCLOSURE

An electronic circuit that connects to the telephone lines for the purpose of detecting and responding to the telephone ring voltage, establishing a two way flow of audio voltage through it and a way of actuating or deactuating any apparatus that it is a part of. When the calling party hangs up the telephone handset the electronic circuit that was called hangs up immediately by stopping the current flow through it and de-actuating whatever apparatus it is a part of.

The scope of my invention is a means of audio coupling to and actuation of tape recorders, dictation machines, telephone answering equipment, office intercom systems, public address systems, desk speakers, telephone amplifiers, radio transmitters, radio receivers, instrumentation and control equipment, voice activated recorders and/or typewriters, or other devices by means of an electronic circuit that replaces the pick up coils, special designed amplifiers, and complex relay systems and other apparatus used to detect the telephone ring voltage and actuated any device.

The specially designed amplifiers, relay systems and other apparatus now in use, which are used to audio couple and actuate a device, have much poorer reliability than my simple electronic circuit and cost considerably more. All of the automatic telephone answering systems now in use, require a source of power in addition to the phone line power to energize or operate these relays, amplifiers and etc. My system does not require an additional power supply, and can be used with battery powered devices without affecting the life of the batteries.

The heart of my circuit is a solid state device controlled switch-type semiconductor device, such as a so-called silicon controlled rectifier (SCR, triac, and etc. which begins to conduct upon receiving an electrical impulse and continues to conduct until the flow of electric current through the device is interrupted, the polarity is reverse, or it is forced off with an electrical impulse as in the case of a silicon controlled switch (SCS). The SCR may be triggered from a manual source such as a switch or an automatic source such as a ring detector and etc.

My basic circuit is shown in the drawing.

In the case of the automatic telephone answering circuit, at the beginning of a telephone call the A.C. telephone ring, voltage comes in over the phonse lines and is rectified by the full wave diode rectifier bridge 1, 2, 3, and 4. The resultant rectified, positive voltage flows down through resistors 5 and diode 6 and builds up an electrical charge on capacitor 7. The diode 6 prevents a reversal of current flow from capacitor 7 during the no A.C. voltage portion of the complete phone ringing cycle. The size of resistor 5 determines the length of time it takes to build up a charge on capacitor 7 and determines the number of times the phone will ring before line seize will take place. The current flows from capacitor 7 through resistor 8 and charges capacitor 9 building up a voltage on it. The purpose of resistor 8 and capacitor 9 is to introduce a time delay to prevent the circuit from attempting to seize the telephone line when the bell has just started to ring. Capacitor 9 is also used to store some of the rectified ring voltage. The current flows through resistor 10 and charges capacitor 11 and builds up a charge across the neon bulb 12. These components 10, 11 and 12 make up a relaxation oscillator. When the voltage across 11 has built up to a sufficient value to ionize the neon lamp 12 the lamp starts to conduct current through it and oscillates at a frequency determined by the size of components 10 and 11 and the voltage across capacitor 9. The purpose of resistor 13 is to clamp the gate electrode of the SCR 14 to ground, thus preventing its accidental firing. The current from the neon bulb is directed through the normally closed relay contacts 25 and on to the SCR gate, turning on the SCR 14. The completion of the D.C. circuit, through the answering circuit, causes the central office telephone equipment to stop the ring signal and reverse the D.C. polarity across the telephone lines. The SCR having been turned off by the current interruption caused by the central office is retriggered by the relaxation oscillator and other components of the ring voltage detector. This action couples the amplifier or other device to the phone lines through the audio transformer 15. At the same time relay 16 is energized by the telephone battery causing the relay's contacts to close. When the relay contacts close, they activate the other relays, SCR's, transistors and other solid state devices, which causes the answering machine or other equipment to operate. The second set of relay contacts should be reserved so as to be used to operate the hold circuit on multiple line rotary telephones. Should you so desire a third set of relay contacts, could be used to operate call counters, lights, alarms and many other devices.

When the calling party hangs up, the D.C. polarity of the phone lines reverts back to its original state, thus removing the voltage from the SCR for an instant, permitting the SCR to revert back to its nonconducting state and stopping the current flow through it. This disconnects the audio transformer from the other equipment and de-energizes the relay. This causes the equipment that was activated by relay 16 to stop operating. The calling party control feature prevents the recording of dial tone along with the incoming message as happens in the case with the time sequence of voice activated answering machines. The purpose of resistor 18 is to permit the voltage on the capacitors to slowly bleed off so that the ring detector will not cause a line size when the phone is dialed, the hand set is picked up, or hung up. The voltage bleeds down until it is the same value as the telephone battery voltage and remains at that value until the next phone call. The bleed resistors can be placed anywhere in the detectors network but it seems to work best in the position shown in the drawing. The diode 17 is hooked in parallel with the transformer and relay to suppress inductive transient voltages in this part of the circuit. The diode bridge also causes the voltage to be the same polarity acros the SCR no matter which polarity it is on the telephone lines and permits the circuit to be connected to the phones without having to be concerned about the phone line polarity. The capacitors 20 and 21 balance the phone lines with respect to ground on A.C. powered devices to control hum.

A resistor 19 of the right value or a variable resistor, can be placed in parallel with the relay to shunt part of the current around the relay and cause it to de-energize thus letting their contacts break their circuits when the hand set on the phone is picked up. When the hand set is picked up part of the current that would have gone through the relay now goes through the telephone hand set and there is not enough current through the relay to keep it energized. With the relay de-energized the device it had activated now stops operating and the answering machine and etc. can not record or interfere with any two way conversation over the phone.

The audio coupling device shown in the figure is shown as a transformer in series with the relay. The transformer could also be hooked in parallel with the relay coil as far as the audio voltage is concerned. One lead of the transformer primary could go to the point 22 and the other lead of the primary would go to a coupling capacitor. The other lead of the coupling capacitor would go to point 23 and in this case point 23 would go directly to the anode of the SCR. It is also obvious that other arrangements of various electrical and/or other electronic components could be used to audio couple to the phone lines. The relay 24 is put in the circuit only when one operation must start and go to completion before a second operation can start. In the case of an answering machine the relay 24 selenoid would be hooked electrically in parallel with the power leads to the outgoing announcement tape's motor. When power is applied to the motor at the same time it is applied to the relay to energize it.

The relay 24 also serves another useful purpose, as explained below. The relay contacts 24 are normally closed when the relay is de-energized, but when it is energized, it keeps the SCR from being triggered by a second telephone call before the announcement tape has completed its cycle and is ready to start at the beginning of the announcement. This is assuming that the first caller called the machine and promptly hung up before the announcement was finished. When the relay is de-energized the gate pulse can trigger the SCR instantly if there is trigger voltage stored in the ring detector circuit.

The relay contacts 26 are normally closed also when the relay is deenergized. These relay contacts are open during the announcement on the answering machine for the same reason as explained earlier, at the end of the announcement relay 24 de-energizes and with relay 16 energized, due to a phone call, this completes an electrical circuit through both sets of relay contacts. This completed circuit could turn on an incoming message recording machine or any other machine. This machine will operate until the calling party hangs up, as explained earlier.

A silicon controlled switch would have to be used in place of the SCR in those telephone exchanges that do not have a voltage drop out when the calling party hangs up. If there is a dial tone when the calling party hangs up a dial tone detecting and amplifying circuit, responsive only to the dial tone frequencies could be used. The amplifier would feed into and operate a blocking oscillator or some other pulse producing circuit which in turn would be coupled to the gate of the silicon controlled switch. By feeding a positive pulse to the anode gate of the silicon cotrolled switch it will turn off.

The unique of my circuit is the fact that it takes advantage of the fact that the telephone line polarity reverses after completion of a D.C. path through the device to which the phone lines are connected and again after the calling party hangs up. In this invention the polarity reversal on the phone lines occurs at a desirable time to be useful.

The relaxation oscillator used in this circuit could use a solid state semiconductor device instead of a neon bulb. The relaxation oscillator produces trigger pulses, to trigger the SCR, at a fast rate and for a period of time somewhat longer than the time it takes for the telephone central office equipment to settle down into the completed call condition.

The telephone lines are connected to my circuit at terminals 27 and 28. This is where battery, ground and ring voltage from the telephone lines come into the answering circuit.

Terminals 29 and 30 go to a relay contacts which when they close turns on the outgoing message recorder. When relay 16 is energized and relay 24 is deenergized a circuit is completed through terminals 31 and 32 to turn on an incoming message recorder.

Terminals 33 and 34 are the terminals that bring the incoming message audio to the incoming message mechanism of a telephone answering machine.

Terminals 35 and 36 are connected in parallel with the outgoing message motor and relay 24 is energized only during the time that the outgoing message is going out. When relay 24 is energized contacts 25 and 26 both open and breaks both circuits.

I claim:

1. A circuit device connected to telephone lines which carry telephone voltage and A.C. ring voltage, comprising: a ring voltage detector circuit, means for carrying a small amount of the ring power to said ring voltage detector circuit, a solid state switch type semiconductor device coupled to said telephone lines and having a control electrode, processing means connected between said ring voltage detecting circuits and said control electrode to switch said semiconductor device from non-conducting to conducting state in response to the presence of ring voltage on said telephone lines, causing seizure of phone connection and polarity reversal of said telephone voltage, holding circuit means to retain said semiconductor device in a conducting state until hang up of the calling party causes reversion of polarity of said telephone voltage to its original state, controlled means, actuating means for said controlled means, coupling means to couple said controlled means to said telephone lines, and means responsive to said polarity reversal to enable said actuating and coupling means.

2. The circuit of claim 1, further comprising means coupled to said semiconductor device to render said circuit operative without regard as to polarity of connection to said telephone lines.

3. A circuit for actuating and deactuating a device, and for audio coupling said device to telephone lines, in response to ring voltage on said lines, comprising: a full wave rectifier bridge connected across said lines; a solid state rectifier switch having a controlled gate electrode; a limiting resistor and diode connected in series; said resistor and diode series combination, the output of said rectifier bridge, and the input of said solid state rectifier switch all being connected together; an integrating network comprising two capacitors and a resistor; said integrating network being connected in series with a relaxation oscillator comprising a resistor, capacitor and a neon bulb; the input of said rectifier bridge and the output of said solid state rectifier switch being connected to said integrating network and said relaxation oscillator; the output of said resistor and diode series combination being connected to the input of said integrating network; a relay; means connecting the relaxation oscillator through the contacts of the relay to said control electrode of said solid state rectifier switch; the circuit being responsive to the presence of ring voltage to turn on said solid state rectifier switch; and relay means responsive to said solid state rectifier switch's turning on to activate and audio couple said device.

References Cited

UNITED STATES PATENTS

| | | | |
|---|---|---|---|
| 3,189,811 | 6/1965 | King | 307—257 X |
| 3,221,241 | 11/1965 | Greenberg | 321—47 |
| 3,325,598 | 6/1967 | O'Neill. | |
| 3,360,777 | 12/1967 | Kolm. | |

RALPH D. BLAKESLEE, Primary Examiner

U.S. Cl. X.R.

307—257